US012536111B2

(12) United States Patent
Ali et al.

(10) Patent No.: US 12,536,111 B2
(45) Date of Patent: Jan. 27, 2026

(54) SYSTEMS AND METHODS FOR SEMICONDUCTOR DEVICES WITH EXTENDED HIGH-BANDWIDTH MEMORY (HBM) OFFSETS

(71) Applicant: Avago Technologies International Sales Pte. Limited, Singapore (SG)

(72) Inventors: Anwar Ali, San Jose, CA (US); Deepam Trivedi, Santa Clara, CA (US); Ho-Hsin Yeh, Belmont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 147 days.

(21) Appl. No.: 18/474,384

(22) Filed: Sep. 26, 2023

(65) Prior Publication Data

US 2024/0403240 A1 Dec. 5, 2024

Related U.S. Application Data

(60) Provisional application No. 63/505,934, filed on Jun. 2, 2023.

(51) Int. Cl.
*G06F 13/16* (2006.01)
*G06F 13/42* (2006.01)

(52) U.S. Cl.
CPC ...... *G06F 13/1673* (2013.01); *G06F 13/1678* (2013.01); *G06F 13/4234* (2013.01)

(58) Field of Classification Search
CPC ............. G06F 13/1673; G06F 13/1678; G06F 13/4243
See application file for complete search history.

(56) References Cited

U.S. PATENT DOCUMENTS 10,658,322 B2 5/2020 Kwon et al.
10,998,291 B2 5/2021 Keeth
(Continued)

FOREIGN PATENT DOCUMENTS

CN 111488309 A 8/2020
EP 4064347 A1 9/2020
(Continued)

OTHER PUBLICATIONS

S. Park, Y. et al., "2.5D Large-Scale Interposer Bonding Process Verification using Daisy-Chain for PIM Heterogeneous Integration Platform," 2023 ICEIC, Singapore, Feb. 5-8, 2023, pp. 1-3, available online Mar. 10, 2023, doi: 10.1109/ICEIC57457.2023. 10049851. (Year: 2023).*

(Continued)

*Primary Examiner* — Eric T Oberly
(74) *Attorney, Agent, or Firm* — Quarles & Brady LLP

(57) ABSTRACT

The subject technology is directed to systems and methods for semiconductor devices with extended high-bandwidth memory (HBM) offsets. In a specific embodiment, the subject technology provides an apparatus that includes a circuit comprising a first connector and a second connector. The circuit is configured to send a first signal using the first connector to indicate a first selection. The apparatus further includes a first memory device comprising a first selector and a third connector and a fourth connector. The first selector is configured to couple the third connector to the second connector based on the first signal. The one or more connectors of the first memory devices cover a broad distance to ensure robust connectivity between the circuit and the first memory device. There are other embodiments as well.

18 Claims, 7 Drawing Sheets

(56) References Cited

U.S. PATENT DOCUMENTS

| | | |
|---|---|---|
| 11,036,660 B2 | 6/2021 | Ooi et al. |
| 11,562,993 B2 | 1/2023 | Collins |
| 2016/0163609 A1* | 6/2016 | Rahman .............. H01L 25/0652 257/48 |
| 2018/0102776 A1 | 4/2018 | Chandrasekar et al. |
| 2018/0358313 A1 | 12/2018 | Newman et al. |
| 2021/0407962 A1 | 12/2021 | Kim et al. |
| 2022/0028848 A1 | 1/2022 | Baek |
| 2022/0302080 A1* | 9/2022 | Ali ........................ H01L 23/562 |
| 2022/0358072 A1 | 11/2022 | Vergis et al. |

FOREIGN PATENT DOCUMENTS

| | | |
|---|---|---|
| EP | 3855442 A1 | 7/2021 |
| TW | 202143229 A | 11/2021 |

OTHER PUBLICATIONS

Thomas Wong, "Enabling Cost-Effective, High-Performance Die-To-Die Connectivity," Jul. 9, 2020, 16 pages.

Marketwired, "Open-Silicon Tapes Out Industry's First High Bandwidth Memory (HBM2) IP Subsystem Solution for 2.5D ASICs in 16nm FF+," Sep. 28, 2016, 3 pages.

Cho et al., "Design and Analysis of Power Distribution Network (PDN) for High Bandwidth Memory (HBM) Interposer in 2.5D Terabyte/s Bandwidth Graphics Module," May 1, 2016, 6 pages.

Jedec Solid State Technology Association, Jedec Standard, Low Power Double Data Rate 4 (LPDDR4), JESD209-4, Aug. 2014, 195 pages.

Wikipedia, Multiplexer, https://en.wikipedia.org/w/index.php?title=Multiplexer&oldid=953736475, Apr. 28, 2020, 8 pages.

European Patent Office, Extended Search Report, Application No. 24179346.2, Oct. 8, 2024, 12 pages.

\* cited by examiner

SYSTEMS AND METHODS FOR SEMICONDUCTOR DEVICES WITH EXTENDED HIGH-BANDWIDTH MEMORY (HBM) OFFSETS

CROSS REFERENCE TO RELATED APPLICATIONS

This application is a non-provisional application of U.S. Patent Application No. 63/505,934, filed Jun. 2, 2023, by Ali et al. and titled, "Extended HBM Offsets Using Wide Interfaces", the entire teachings of which is incorporated herein by reference in its entirety for all purposes.

FIELD OF INVENTION

The subject technology is directed to systems and methods for semiconductor devices with extended high-bandwidth memory (HBM) offsets.

BACKGROUND OF THE INVENTION

Over the past decades, the realm of semiconductor integration has witnessed considerable advancements, particularly in the strategic positioning and interconnection of integrated circuit (IC) devices. Various approaches involve placing IC devices side-by-side on an interposer, which facilitates high-density connections between IC components, allowing for efficient and compact designs. For instance, in a 2.5D interposer configuration, one or more high-bandwidth memories (HBMs) can be connected to an application-specific IC (ASIC) in accordance with a set of predetermined routing rules. For example, HBM refers to a memory that provide a high-speed computer memory interface for 3D-stacked synchronous dynamic random-access memory (SDRAM), and it is standardized stacked memory technology that provides very wide channels for data, both within the stack and between the memory and logic. Due to disparities in IC dimensions, one or more HBMs cannot be in alignment with the ASIC and need to be offset from their designated pins on the ASIC. However, it remains challenging to expand these offsets to accommodate various IC size variations and to ensure efficient signal transmission.

Various approaches for increasing HBM offsets have been explored, but they have proven to be insufficient. It is important to recognize the need for new and improved semiconductor devices with extended HBM offsets.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
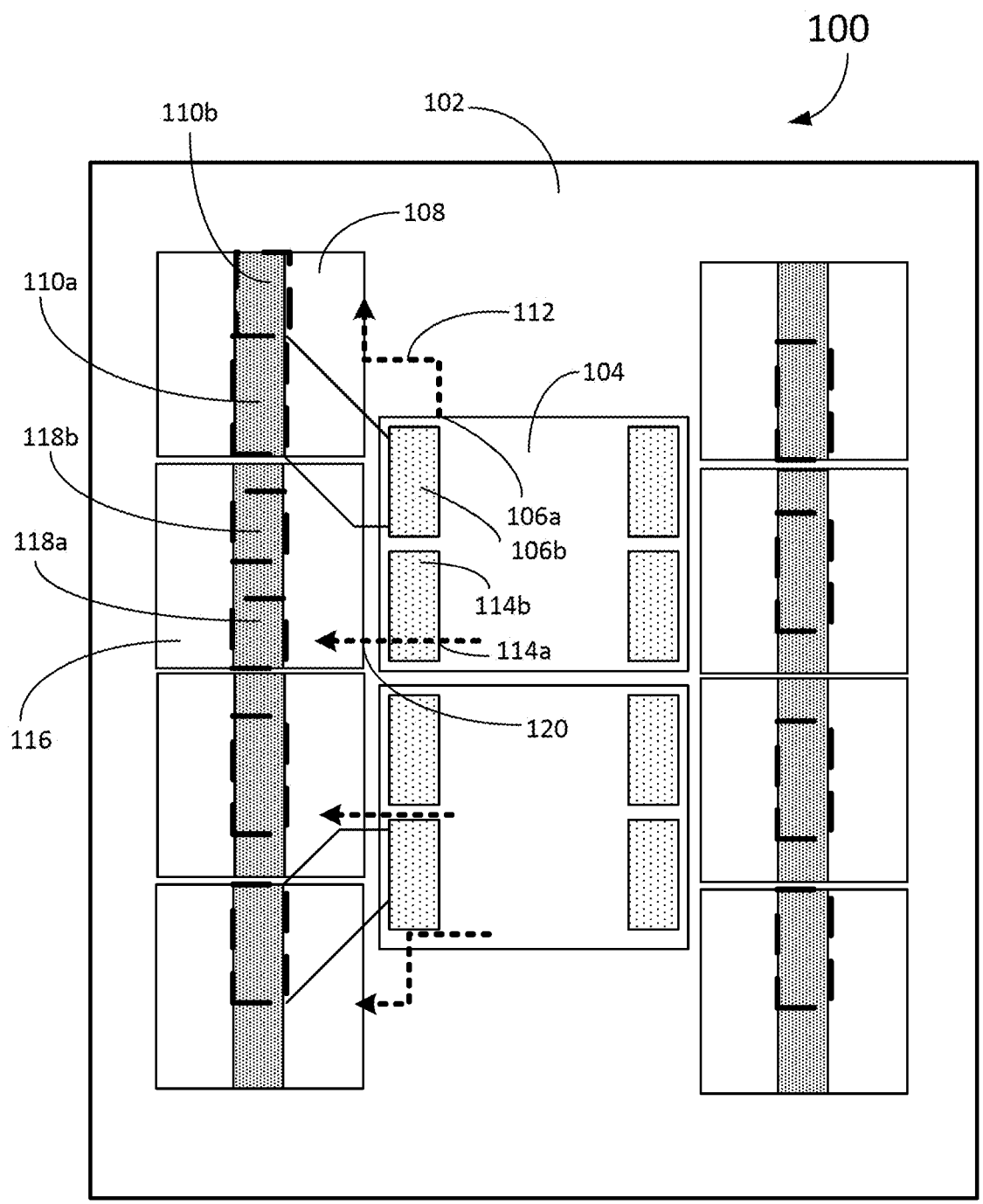
FIG. 1 is a simplified diagram illustrating a semiconductor device characterized by an integration scheme according to embodiments of the subject technology.

The subject technology is directed to systems and methods for semiconductor devices with extended high-bandwidth memory (HBM) offsets. In an embodiment, the subject technology provides an apparatus that includes a circuit comprising a first connector and a second connector. The circuit is configured to send a first signal using the first connector to indicate a first selection. The apparatus further includes a first memory device comprising a first selector and a third connector and a fourth connector. The first selector is configured to couple the third connector to the second connector based on the first signal. The one or more connectors of the first memory devices cover a broad distance to ensure robust connectivity between the circuit and the first memory device. There are other embodiments as well.

Some approaches for implementing semiconductor integration involve connecting one or more HBM to an ASIC through interconnects in interposer. For instance, an HBM can be centered to its associated physical layer (PHY) circuit (e.g., transceiver) within the ASIC to ensure minimized routing distances and optimal signal transmission. This, however, is not always practical due to IC size mismatches. Consequently, the HBM may be offset from its corresponding PHY circuit on the ASIC. Due to the dense nature of interconnections—for example, there may be thousands of wires spanning a finite width on limited layers—geometric boundaries pose significant constraints in such integration schemes. These geometric and spatial limitations dictate the permissible distance by which an HBM can be offset relative to its corresponding PHY circuit within the ASIC. Moreover, complexity is further added when considering the vertical dimension disparity. For example, one or more HBMs may be vertically stacked together and connect to an ASIC. The potential height difference between the stacked HBMs and the ASIC can lead to offsets between the HBM and ASIC that are too challenging to route effectively.

In various embodiments, the subject technology provides semiconductor devices that accommodate extended HBM offsets without comprising routing efficiency or signal integrity. By providing a number of connectors (e.g., IO pins) on the HBM that covers an expansive distance for establishing connections with the ASIC, the increased HBM offsets can be achieved without increasing the IC dimensions. With the capacity for extended HBM offsets, ASICs can potentially be designed smaller as they are no longer bound to match the size of the HBMs. Moreover, enhanced product performance can be realized through the intelligent selection of HBM connectors, which ensures minimized routing lengths, thereby boosting signal integrity and the operational speed of both the interface and the IC components. The culmination of these features leads to improved thermal efficiencies, attributed to the minimized wire lengths and reduced power consumption. It is to be appreciated that the subject technology is adaptable to any semiconductor integration scheme and is not limited to the HBM and ASIC connections.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the subject technology is not intended to be limited to the embodiments presented but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect includes an apparatus comprising a circuit. The circuit comprises a first connector and a second connector. The circuit is configured to send a first signal using the first connector to indicate a first selection. The second connector is positioned at a first location. The apparatus also includes an interposer that has a first interconnect and a second interconnect. In some embodiments, a first memory device comprises a first selector, a third connector, and a fourth connector. The first selector is coupled to the first connector through the first interconnect. The first selector is configured to couple the third connector to the second connector through the second interconnect based on the first signal. The third connector is positioned closer to the first location than the fourth connector.

Implementations may include one or more of the following features. The circuit may further include a second memory device. The circuit may further comprise a fifth connector and a sixth connector. The circuit is configured to send a second signal using the fifth connector to indicate a second selection. The sixth connector is positioned at a second location. The interposer may further comprise a third interconnect and a fourth interconnect. The second memory device may comprise a second selector and a seventh connector and an eighth connector, the second selector being coupled to the fifth connector through the third interconnect, the second selector being configured to couple the sixth connector to the seventh connector based on the second signal. The seventh connector may be closer to the second location than the eighth connector. The circuit may comprise an application-specific integrated circuit. The first memory device may comprise a high bandwidth memory. The first connector may comprise a physical layer circuit. The third connector may be coupled to the second connector in accordance with a predetermined routing rule.

According to another embodiment, the subject technology provides an apparatus that includes a circuit comprising a first connector and a second connector. The circuit may be configured to send a first signal using the first connector to indicate a first selection. The second connector may be positioned at a first location. The apparatus may further include an interposer comprising a first interconnect and a second interconnect. The apparatus may further include a first buffer die comprising a first selector and a third connector and a fourth connector. The first selector may be coupled to the first connector through the first interconnect. The first selector may be configured to couple the third connector to the second connector through the second interconnect based on the first signal. The third connector may be positioned closer to the first location than the fourth connector.

Implementations may include one or more of the following features. The apparatus may further comprise a first memory device coupled to the first buffer die. The apparatus may further comprise a first memory device coupled to the interposer. The first memory device may comprise a high bandwidth memory. The circuit may comprise an application-specific integrated circuit. The first buffer die may be coupled to the interposer. The third connector may be coupled to the second connector in accordance with a predetermined routing rule characterized by a first routing angle. The first routing angle may be less than or equal to 45 degrees. The third connector may be coupled to the second connector through the second interconnect. The first selector may comprise a multiplexor. The first connector may comprise a physical layer circuit.

According to yet another embodiment, the subject technology provides an apparatus that comprises a circuit comprising a first connector and a second connector. The circuit may be configured to send a first signal using the first connector to indicate a first selection. The second connector may be positioned at a first location. The apparatus may further comprise an interposer coupled to the circuit, the interposer comprising a first interconnect. The apparatus may further comprise a first memory device. The first memory device may comprise a first selector and a third connector and a fourth connector. The first selector may be coupled to the first connector through the first interconnect. The first selector may be configured to couple the third connector to the second connector based on the first signal. The third connector may be positioned closer to the first location than the fourth connector. In some embodiments, the circuit may comprise an application-specific integrated circuit. The first memory device may comprise a high bandwidth memory. The first selector may comprise a multiplexor.

FIG. 1 is a simplified diagram illustrating a semiconductor device 100 characterized by an integration scheme according to embodiments of the subject technology. This diagram merely provides an example, which should not unduly limit the scope of the claims. As shown, semiconductor device 100 includes a circuit 104. For example, circuit 104 may include an application-specific integrated circuit (ASIC). The term "application-specific integrated circuit" may refer to an integrated circuit (IC) chip customized for particular use including, without limitation, digital signal processing, image processing, network data routing, machine learning, and/or any application demanding specific computational needs. In some embodiments, circuit 104 includes a first connector 106a and a second connector 106b. Second connector 106b may be positioned at a first location. As an example, first connector 106a and second connector 106b may include a physical layer (PHY) circuit. The term "PHY circuit" or "PHY circuit pin" may refer to a segment of a semiconductor chip that handles the physical and data link layer connectivity and can be used in network interfaces or communication transceivers.

Semiconductor device 100 may further include an interposer 102. The term "interposer" may refer to an electrical interface that redirects electrical connections between electrical components, which can spread a connection to a wider pitch or to reroute a connection to a different connection. For instance, interposer 102 may include a substrate that facilitates electrical connections between an ASIC (e.g., first circuit 104) and other components (e.g., memory devices) using one or more interconnects, allowing for high-speed data transfer and compact semiconductor integration. In various implementations, semiconductor device 100 further includes a first memory device 108. For example, first memory device 108 may include a high-bandwidth memory (HBM). The term "high-bandwidth memory" may refer to a high-speed random-access memory interface designed for use in high-performance applications, such as graphics cards, high-performance computing, machine learning, and/or the like.

The connection between circuit 104 and first memory device 108 may be established via interposer 102, which serves as a bridging substrate to ensure high-fidelity data exchange between the memory and the processing components. According to various implementations, circuit 104 may be coupled to one or more memory devices via one or more connectors. For instance, first memory device 108 includes a third connector 110a, and a fourth connector 110b. Third connector 110a and fourth connector 110b may include one or more interface (IO) pins. For example, the term "IO pin" may refer to a physical pin on an integrated circuit or electronic circuit board whose function is input or output. For instance, third connector 110a may be coupled to second connector 106b such that first memory device 108 is coupled to circuit 104, establishing data exchange and signaling between the components.

Depending on the implementation, first memory device 108 and circuit 104 may be characterized by a size mismatch. In an example, circuit 104 has a size of 20×13 mm, and first memory device 108 has a size of 11×11 mm. According to some embodiments, the number of connectors on first memory device 108 may be greater than the number of connectors on circuit 104. In some cases, not all connectors on first memory device 108 are utilized.

As shown in FIG. 1, first memory device 108, instead of aligning to first circuit 104, may be offset from circuit 104 and/or its corresponding connector (e.g., second connector 106b) by a certain angle or distance. For instance, circuit 104 is configured to send a first signal 112 through first connector 106a to indicate a first selection (e.g., determining which connector on first memory device 108 is used to couple to second connector 106b). The first selection can be determined based on various factors (e.g., a predetermined routing rule, routing length, routing angle, signal integrity, power efficiency, thermal considerations, and/or the like). In some embodiments, first memory device 108 further includes a first selector, which is configured to couple third connector 110a to second connector 106b based on first signal 112. Third connector 110a may be positioned closer to the first location than fourth connector 106, allowing for reduced routing distances. Depending on the implementation, third connector 110a is coupled to second connector 106b in accordance with a predetermined routing rule. The predetermined routing rule may be characterized by a first routing angle, or others (e.g., routing length, routing angle, etc.). The first routing angle can be less than or equal to 45 degrees.

In various implementations, semiconductor 100 further includes a second memory device 116. For example, second memory device 116 may include an HBM. For instance, circuit 104 further includes a fifth connector 114a and a sixth connector 114b. Fifth connector 114a and sixth connector 114b may include a PHY circuit (e.g., transceiver). As an example, circuit 104 is configured to send a second signal 120 using the fifth connector 114a to indicate a second selection (e.g., determining which connector on second memory device 116 is used to couple to sixth connector 114b). The second selection can be determined based on various factors (e.g., a predetermined routing rule, routing length, routing angle, signal integrity, power efficiency, thermal considerations, and/or the like).

In some embodiments, second memory device 116 includes a seventh connector 118a and an eighth connector 118b. Seventh connector 118a and eighth connector 118b may include one or more interface (IO) pins. Sixth connector 114b may be coupled to seventh connector 118a based on second signal 120. In some cases, second signal 120 may determine the selection of connectors on second memory device 116 based on its distance to sixth connector 114b to ensure minimized routing length. For instance, sixth connector 114b may be positioned at a second location. Sixth connector 114b can be coupled to seventh connector 118a. Seventh connector 118a may be closer to the second location than the eighth connector 118b.

Figure 2:
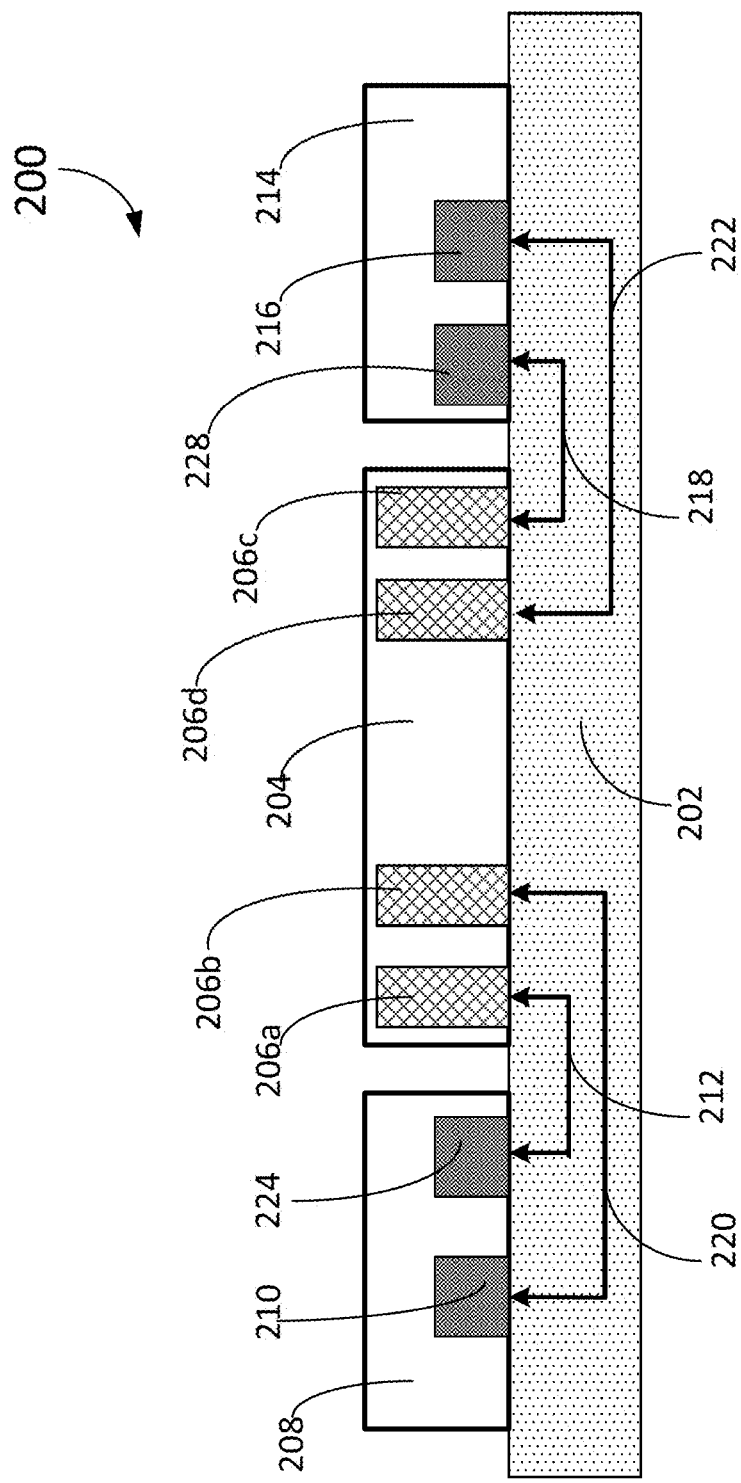
FIG. 2 is a simplified diagram illustrating a cross-section view of a semiconductor device characterized by an integration scheme according to embodiments of the subject technology.

FIG. 2 is a simplified diagram illustrating a cross-section view of a semiconductor device 200 characterized by an integration scheme according to embodiments of the subject technology. This diagram merely provides an example, which should not unduly limit the scope of the claims. As shown, semiconductor device 200 includes a circuit 204. For example, circuit 204 may include an ASIC. Circuit 204 includes a first connector 206a and a second connector 206b. Second connector 206b is positioned at a first location. As an example, first connector 206a and second connector 206b may include a PHY circuit, which can be configured for facilitating electrical, mechanical, and/or procedural bridging among electrical components.

According to some embodiments, semiconductor 200 further includes an interposer 202. Interposer 202 may be configured to provide electrical connections for circuit 204 and/or other components. As an example, interposer 202 includes a first interconnect 212 and a second interconnect 220. The term "interconnect" may refer to an electrical structure that establishes electrical pathways between different components or sections of the semiconductor device, allowing for data, signal, and/or power transmission. For example, first interconnect 212 and second interconnect 220 may include, without limitation, metal traces, vias, and/or other conductive materials and structures.

In various implementations, a first memory device 208 may be coupled to circuit 204 via interposer 202. For instance, first memory device 208 may include an HBM and is configured to boost bandwidth and reduce power consumption. First memory device 208 may be coupled to circuit 204 to facilitate rapid data processing and transmission for computation-intensive applications. Circuit 204 is coupled to first memory device 208 via one or more connectors. In some cases, the number of connectors on first memory device 208 may be greater than the number of connectors on first circuit 204. As an example, first memory 208 includes a first selector 224, a third connector 210, and a fourth connector (not shown). Third connector 210 and the fourth connector may include one or more IO pins.

As previously noted, when considering the extensive connectors available on first memory device 208, only a subset of these connectors might be selected for routing towards circuit 204. The intelligent selection of connectors results in enhanced connectivity, aligning with the objectives of minimizing the routing length and ensuring efficient electrical connections between first memory device 208 and circuit 204. As an example, circuit 204 is configured to send a first signal using first connector 206a to indicate a first selection (e.g., determining which connector on first memory device 208 is used to couple to second connector 206b). The first selection can be determined based on various factors (e.g., a predetermined routing rule, routing length, routing angle, signal integrity, power efficiency, thermal considerations, and/or the like).

Depending on the implementation, a data path selection mechanism may be adopted to implement the first selection, establishing an optimized electrical connection between first memory device 208 and circuit 204. For instance, first selector 224 includes a multiplexor (MUX). The term "multiplexor" may refer to an electrical component that can select one input from multiple available inputs and provide the selected input on its output. First selector 224 may be coupled to first connector 206a through first interconnect 212.

To implement the data path selection mechanism, first selector 224 may be configured to select one or more connectors on first memory device 208 in accordance with the first selection. As an example, the first selection can be determined based on the spatial proximity of connectors on first memory device 208 to their corresponding connector on circuit 204 (e.g., second connector 206b). For instance, third connector 210 may be positioned closer to the first location than the fourth connector. As such, first selector 224 may be configured to couple third connector 210 to second connector 206b based on the first signal. Second connector 206b may be coupled to third connector 210 via second interconnect 220. Accordingly, the electrical connection between circuit 204 and first memory device 208 can be established, facilitating data exchange and signaling between the components.

Depending on the implementation, circuit 204 may be coupled to multiple memory devices. For instance, semiconductor 200 further includes a second memory device 214 coupled to circuit 204. According to some embodiments, circuit 204 further includes a fifth connector 206c and a sixth connector 206d. For instance, fifth connector 206c and a sixth connector 206d may include a PHY circuit, which can be configured for facilitating electrical, mechanical, and/or procedural bridging among electrical components. Sixth connector 206d is positioned at a second location. Interposer 202 further includes a third interconnect 218 and a fourth interconnect 222. Interposer 202 can be configured to establish electrical connections between circuit 204 and second memory device 214.

In various embodiments, second memory device 214 may include a second selector 228, a seventh connector 216, and an eighth connector (not shown). To implement the data path selection mechanism, circuit 204 may be configured to send a second signal using fifth connector 206c to indicate a second selection. Second selector 228 may be coupled to fifth connector 206c through third interconnect 218. For instance, second selector 228 may include a multiplexor, functioning as a data selector by selecting one or more connectors on second memory device 214 to be routed to sixth connector 206d in accordance with the second selection.

As an example, the second selection can be determined based on the spatial proximity of connectors on second memory device 214 to their corresponding connector on circuit 204 (e.g., sixth connector 206d). For instance, seventh connector 216 may be closer to the second location than the eighth connector. As such, second selector 228 may be configured to couple sixth connector 206d to seventh connector 216 based on the second signal. Seventh connector 216 may be coupled to sixth connector 206d through fourth interconnect 222. Accordingly, the electrical connection between circuit 204 and second memory device 214 can be established, facilitating data exchange and signaling between the components.

Figure 3:
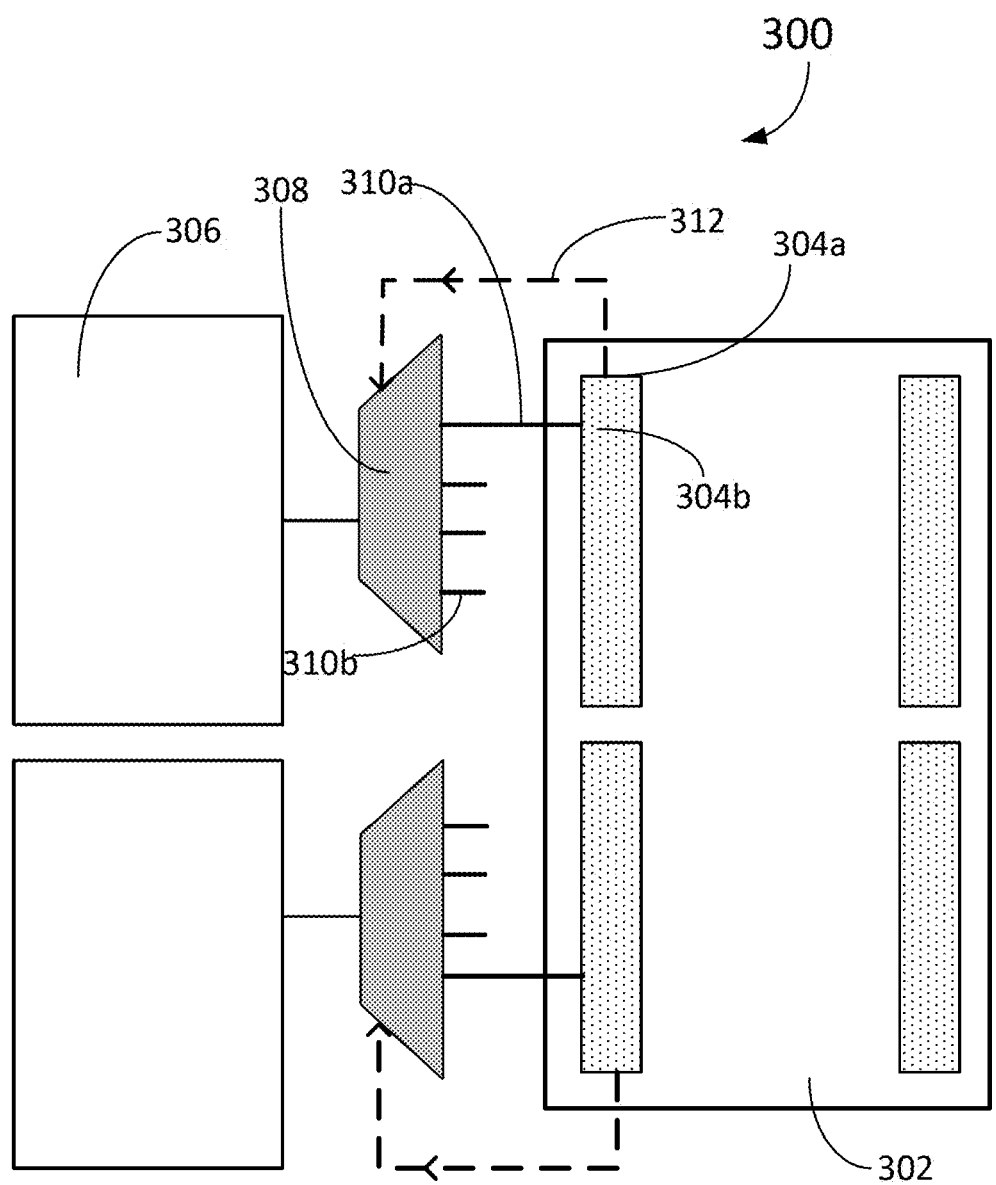
FIG. 3 is a simplified diagram illustrating a semiconductor device characterized by an integration scheme according to embodiments of the subject technology.

FIG. 3 is a simplified diagram illustrating a semiconductor device 300 characterized by an integration scheme according to embodiments of the subject technology. This diagram merely provides an example, which should not unduly limit the scope of the claims. As shown, semiconductor device 300 includes a circuit 302, which may include a first connector 304a and a second connector 304b. Second connector 304b may be positioned at a first location. For example, circuit 302 includes an ASIC. First connector 304a and second connector 304b may include a PHY circuit, which can be configured for facilitating electrical, mechanical, and/or procedural bridging among electrical components. In some embodiments, circuit 302 is coupled to a first memory device 306 via one or more connectors. First memory device 306 may include an HBM. For instance, first memory device 306 includes a first selector 308, a third connector 310a, and a fourth connector 310b. Third connector 310a and fourth connector 310b may include one or more IO pins.

In various implementations, the number of connectors on first memory device 306 may be greater than the number of connectors on first circuit 302. For instance, a data path selection mechanism can be implemented to select a subset of connectors of first memory device 306 for routing towards circuit 302. In an example, circuit 302 may be configured to send a first signal 312 using first connector 304a to indicate a first selection. First selector 308 may be configured to select one or more connectors on first memory device 306 in accordance with the first selection. As an example, the first selection can be determined based the spatial proximity of connectors on first memory device 306 to their corresponding connector on circuit 302 (e.g., second connector 304b). First selector 308 may include a multiplexor. For instance, third connector 310a may be positioned closer to the first location than fourth connector 310b. As such, first selector 308 may be configured to couple third connector 310a to second connector 304b based on the first signal 312. Accordingly, the electrical connection between circuit 302 and first memory device 306 can be established, facilitating data exchange and signaling between the components.

It is to be appreciated that the inclusion of a surplus of connectors (e.g., fourth connector 310b)—which may remain unused in some configurations—underscores a strategic approach for increasing HBM offsets. This excess, rather than being redundant, lends tremendous design flexibility, enabling an optimized routing scheme. By offering a plethora of connectors, first memory device 306 can adapt to various circuit sizes, leading to potential size reductions of circuit 302 (e.g., ASIC). Furthermore, embodiments of subject technology ensure the reusability of the memory device (e.g., first memory device 306), enabling its seamless integration with circuit 302 in various configurations and orientations.

Figure 4:
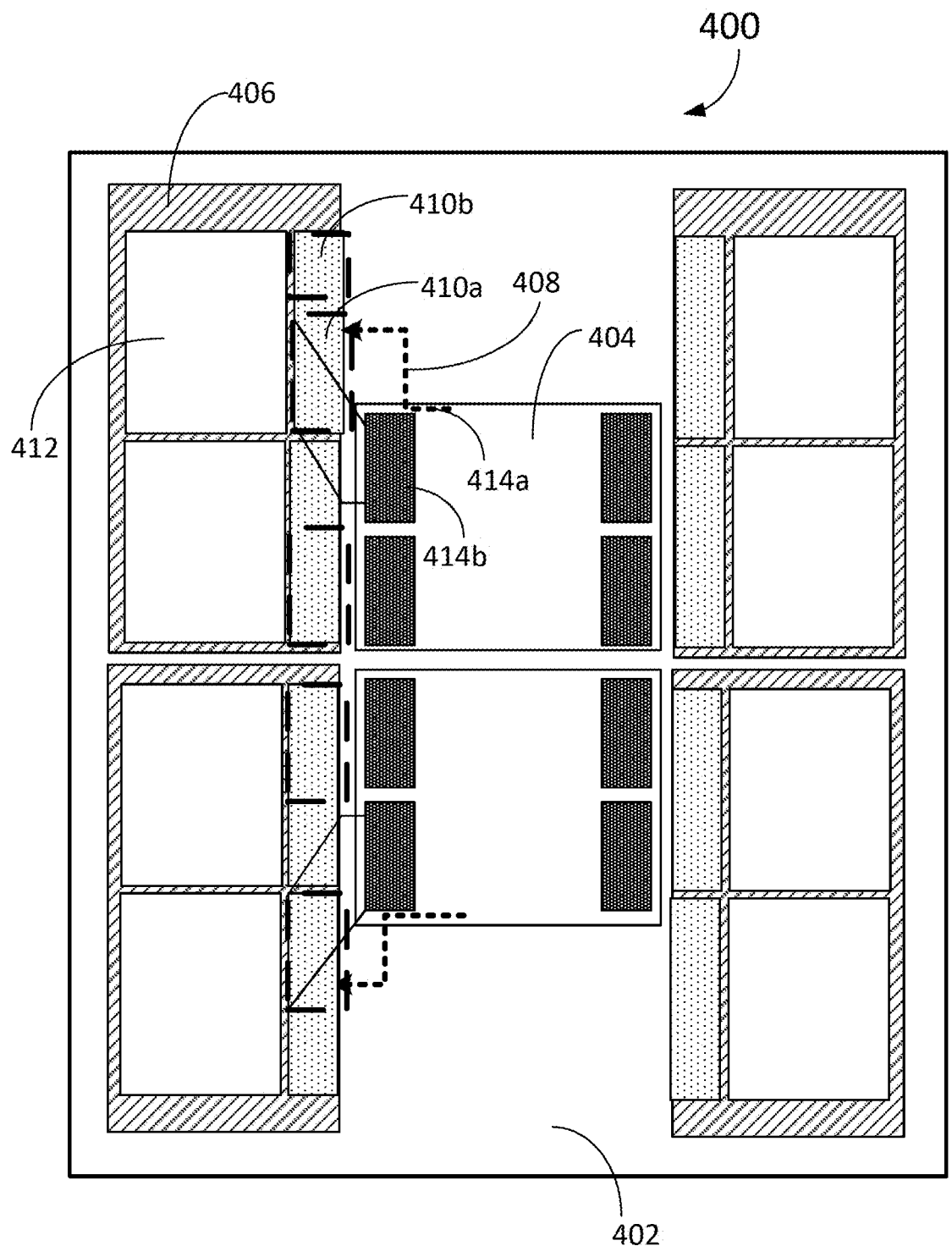
FIG. 4 is a simplified diagram illustrating a semiconductor device characterized by an integration scheme according to embodiments of the subject technology.

FIG. 4 is a simplified diagram illustrating a semiconductor device 400 characterized by an integration scheme according to embodiments of the subject technology. This diagram merely provides an example, which should not unduly limit the scope of the claims. As shown, semiconductor device 400 includes a circuit 404. For example, circuit 404 includes an ASIC, a specialized electrical component designed for executing particular functions with optimized efficiency. Circuit 404 may include a first connector 414a and a second connector 414b. Second connector 414b is positioned at a first location. As an example, first connector 414a and second connector 414b may include a PHY circuit, which can be configured for facilitating electrical, mechanical, and/or procedural bridging among electrical components.

According to some embodiments, semiconductor device 400 further includes an interposer 402. Interposer 402 may be configured to provide electrical connections for circuit 404 and/or other components. In various implementations, a first buffer die 406 may be coupled to circuit 404 via interposer 402. The term "buffer die" may refer to an intermediary silicon component utilized to mediate communication and manage data transfers between semiconductor modules. The terms "die" or "semiconductor die" may refer to a piece or segment of semiconductor material (e.g., silicon), which contains integrated circuitry. This integrated circuitry can encompass various electronic components such as transistors, capacitors, resistors, and other microelectronic structures, which together perform specific electronic functions.

In some embodiments, first buffer die 406 is coupled to interposer 402. First buffer die 406 may also couple to a first memory device 412. Depending on the implementation, first memory device 412 includes an HBM and is configured to boost bandwidth and reduce power consumption. First memory device 412 may be coupled to circuit 404 via first buffer die 406 to facilitate rapid data processing and transmission for computation-intensive applications. For example, first memory device 412 may be assembled on first buffer die 406 and coupled to circuit 404 via first buffer die 406.

In various implementations, first buffer die 406 includes an HBM buffer die configured to covert HBM protocol to an interposer interconnect compatible protocol (e.g., Advanced eXtensible Interface). The capability to translate between different communication standards allows first buffer die 406 to regulate data flows between modules operating at different speeds, advantageously enhancing signal integrity and system reliability. First buffer die 406 may be coupled to circuit 404 via one or more interconnects in the interposer 402, as will be described in further detail below.

As an example, first buffer die 406 may include a first selector (not shown), a third connector 410a, and a fourth connector 410b. Third connector 410a and fourth connector 410b may include one or more IO pins. In various implementations, a data path selection mechanism can be implemented to select a subset of connectors of first buffer die 406 for routing towards circuit 404. Circuit 404 may be configured to send a first signal 408 using first connector 414a to indicate a first selection. As an example, the first selection can be determined based on the spatial proximity of connectors on first buffer die 406 to their corresponding connector on circuit 404 (e.g., second connector 414b). In an example, third connector 410a may be positioned closer to the first location than fourth connector 410b. The first selector may be configured to couple third connector 410a to second connector 414b based on first signal 408. Depending on the implementation, third connector 410a is coupled to second connector 414b in accordance with a predetermined routing rule. The predetermined routing rule may be characterized by a first routing angle. In an example, the first routing angle is less than or equal to 45 degrees.

Figure 5:
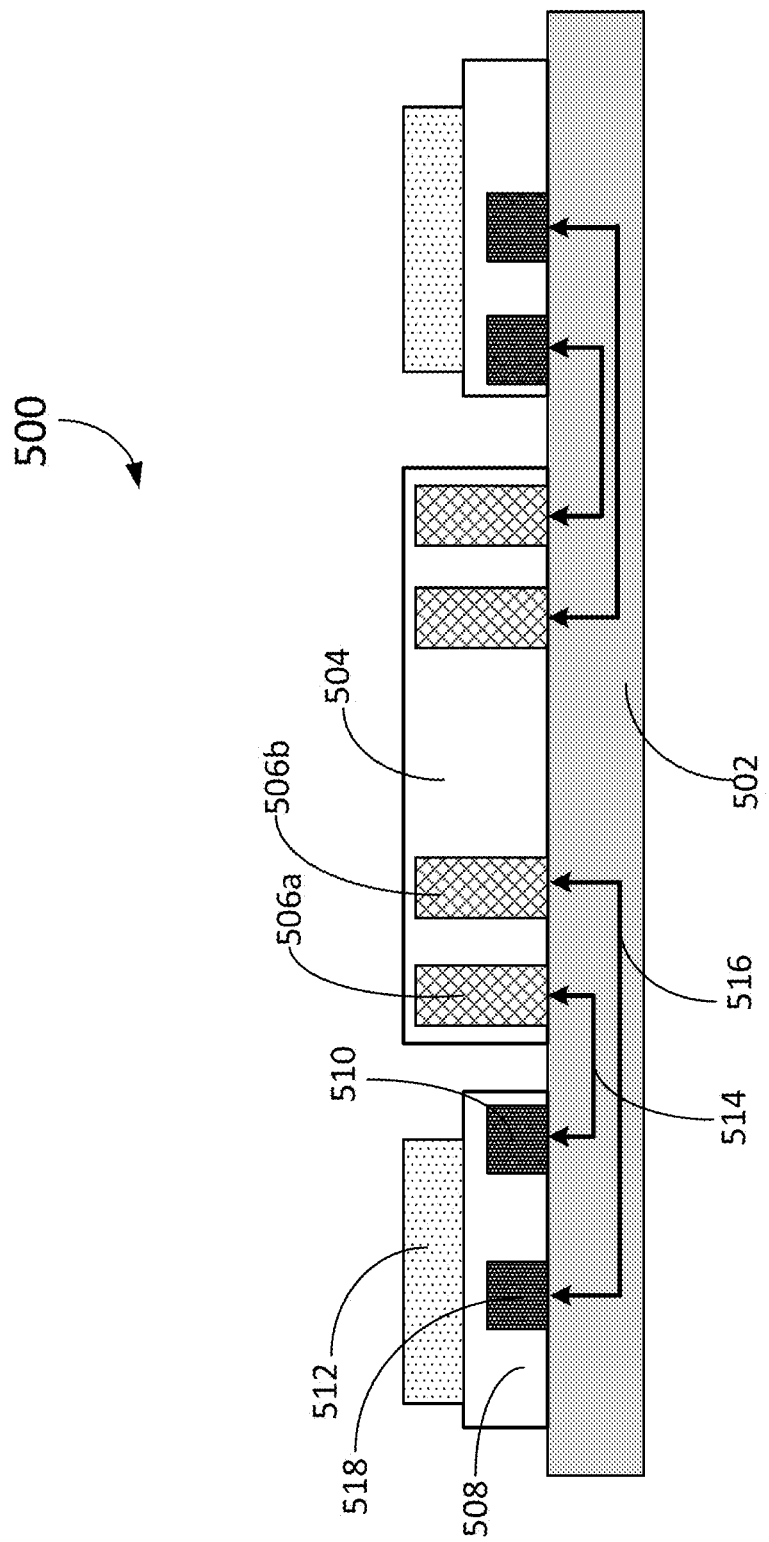
FIG. 5 is a simplified diagram illustrating a cross-section view of a semiconductor device characterized by an integration scheme according to embodiments of the subject technology.

FIG. 5 is a simplified diagram illustrating a cross-section view of a semiconductor device 500 characterized by an integration scheme according to embodiments of the subject technology. This diagram merely provides an example, which should not unduly limit the scope of the claims. As shown, semiconductor device 500 includes a circuit 504. For example, circuit 504 may include an ASIC. Circuit 504 includes a first connector 506a and a second connector 506b. Second connector 506b is positioned at a first location. As an example, first connector 506a and second connector 506b may include a PHY circuit, which can be configured for facilitating electrical, mechanical, and/or procedural bridging among electrical components.

According to some embodiments, semiconductor 500 further includes an interposer 502. For instance, circuit 504 is coupled to interposer 502. Interposer 502 may be configured to provide electrical connections for circuit 504 and/or other components. In various implementations, interposer 502 includes a first interconnect 514 and a second interconnect 516. First interconnect 514 and a second interconnect 516 may include, without limitation, metal traces, vias, and/or other conductive materials and structures.

In various implementations, a first buffer die 508 may be coupled to circuit 504 via interposer 502. For instance, first buffer die 508 is coupled to interposer 502. First buffer die 508 may include a first selector 510, a third connector 518, and a fourth connector (not shown). Third connector 518 and the fourth connector may include one or more IO pins. Depending on the implementation, first buffer die 508 may couple to a first memory device 512. For example, first memory device 512 includes an HBM and is configured to boost bandwidth and reduce power consumption. First memory device 512 may be coupled to circuit 504 via first buffer die 508 to facilitate rapid data processing and transmission for computation-intensive applications.

In various implementations, a data path selection mechanism can be implemented to select a subset of connectors of first buffer die 508 for routing towards circuit 504. Circuit 504 may be configured to send a first signal using first connector 506a to indicate a first selection. As an example, the first selection can be determined based on the spatial proximity of connectors on first buffer die 508 to their corresponding connector on circuit 504 (e.g., second connector 506b). In an example, third connector 518 may be positioned closer to the first location than the fourth connector. First selector 510 may include a multiplexor and be configured to couple third connector 518 to second connector 506b based on the first signal. For instance, first selector 510 is coupled to first connector 506a through first interconnect 514. Third connector 518 is coupled to second connector 506b through second interconnect 516. Depending on the implementation, third connector 518 is coupled to second connector 506b in accordance with a predetermined routing rule. The predetermined routing rule may be characterized by a first routing angle. In an example, the first routing angle is less than or equal to 45 degrees.

Figure 6:
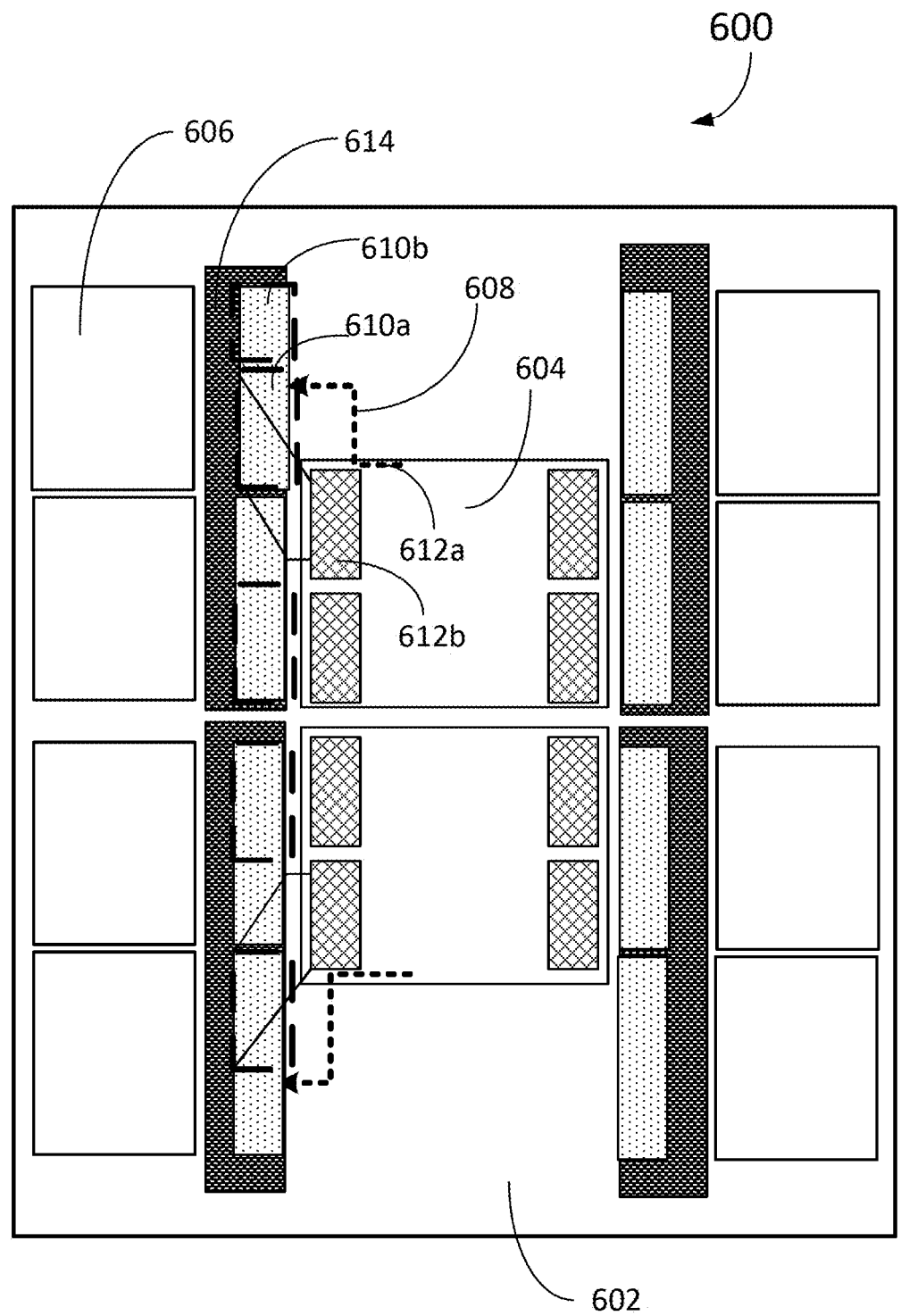
FIG. 6 is a simplified diagram illustrating a semiconductor device characterized by an integration scheme according to embodiments of the subject technology.

FIG. 6 is a simplified diagram illustrating a semiconductor device 600 characterized by an integration scheme according to embodiments of the subject technology. This diagram merely provides an example, which should not unduly limit the scope of the claims. As shown, semiconductor device 600 includes a circuit 604. For example, circuit 604 includes an ASIC, a specialized electrical component designed for executing particular functions with optimized efficiency. Circuit 604 may include a first connector 612a and a second connector 612b. Second connector 612b is positioned at a first location. As an example, first connector 612a and second connector 612b may include a PHY circuit, which can be configured for facilitating electrical, mechanical, and/or procedural bridging among electrical components.

According to some embodiments, semiconductor device 600 further includes an interposer 602. Interposer 602 may be configured to provide electrical connections for circuit 604 and/or other components. For instance, a first buffer die 614 may be coupled to circuit 604 via interposer 602. First buffer die 614 may also couple to a first memory device 606. In an example, first memory device 606 includes an HBM and is configured to boost bandwidth and reduce power consumption. First memory device 606 may be coupled to circuit 604 via first buffer die 614 to facilitate rapid data processing and transmission for computation-intensive applications. In some cases, first buffer die 614 includes an HBM buffer die configured to covert HBM protocol to an interposer interconnect compatible protocol (e.g., Advanced extensible Interface). The capability to translate between different communication standards allows first buffer die 614 to regulate data flows between modules operating at different speeds, advantageously enhancing signal integrity and system reliability.

As an example, first buffer die 614 may include a first selector, a third connector 610a, and a fourth connector 610b. Third connector 610a and fourth connector 610b may include one or more IO pins. In various implementations, a data path selection mechanism can be implemented to select a subset of connectors of first buffer die 614 for routing towards circuit 604. Circuit 604 may be configured to send a first signal 608 using first connector 612a to indicate a first selection. As an example, the first selection can be determined based the spatial proximity of connectors on first buffer die 614 to their corresponding connector on circuit 604 (e.g., second connector 612b). In an example, third connector 610a may be positioned closer to the first location than fourth connector 610b. The first selector may be configured to couple third connector 610a to second connector 612b based on first signal 608. Depending on the implementation, third connector 610a is coupled to second connector 612b in accordance with a predetermined routing rule. The predetermined routing rule may be characterized by a first routing angle. In an example, the first routing angle is less than or equal to 45 degrees.

According to some embodiments, semiconductor device 600 further includes an interposer 602. Interposer 602 may be configured to provide electrical connections for circuit 604 and/or other components. For instance, a first buffer die 614 may be coupled to circuit 604 via interposer 602. First buffer die 614 may also couple to a first memory device 606. In an example, first memory device 606 includes an HBM and is configured to boost bandwidth and reduce power consumption. First memory device 606 may be coupled to circuit 604 via first buffer die 614 to facilitate rapid data processing and transmission for computation-intensive applications. In some cases, first buffer die 614 includes an HBM buffer die configured to covert HBM protocol to an interposer interconnect compatible protocol (e.g., Advanced extensible Interface). The capability to translate between different communication standards allows first buffer die 614 to regulate data flows between modules operating at different speeds, advantageously enhancing signal integrity and system reliability.

As an example, first buffer die 614 may include a first selector, a third connector 610a, and a fourth connector 610b. Third connector 610a and fourth connector 610b may include one or more IO pins. In various implementations, a data path selection mechanism can be implemented to select a subset of connectors of first buffer die 614 for routing towards circuit 604. Circuit 604 may be configured to send a first signal 608 using first connector 612a to indicate a first selection. As an example, the first selection can be determined based the spatial proximity of connectors on first buffer die 614 to their corresponding connector on circuit 604 (e.g., second connector 612b). In an example, third connector 610a may be positioned closer to the first location than fourth connector 610b. The first selector may be configured to couple third connector 610a to second connector 612b based on first signal 608. Depending on the implementation, third connector 610a is coupled to second connector 612b in accordance with a predetermined routing rule. The predetermined routing rule may be characterized by a first routing angle. In an example, the first routing angle is less than or equal to 45 degrees.

As shown in FIG. 6, first buffer die 614 and first memory device 606 may both couple to interposer 602. The electrical connection between first buffer die 614 and first memory device 606 may be established through interposer 602. In some cases, first buffer die 614 is coupled between first memory device 606 and circuit 604. This strategic placement facilitates an increase in the HBM offset and provides design flexibility, allowing for design modifications without necessitating direct alterations to first memory device 606 or circuit 604. Additionally, the spatial buffer introduced by first buffer die 614 aids in better thermal management by offering a spatial separation, ensuring effective heat dissipation and preventing excess thermal load on neighboring components.

Figure 7:
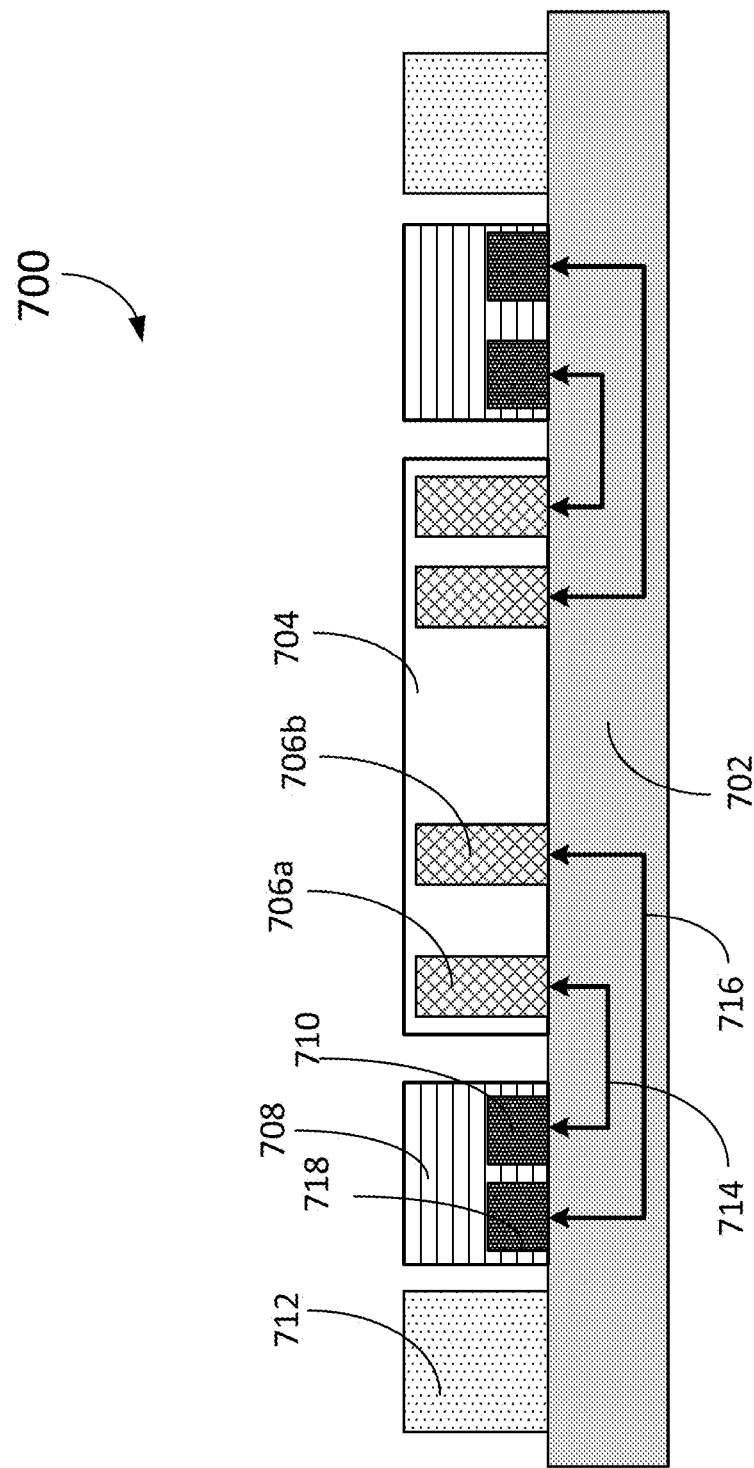
FIG. 7 is a simplified diagram illustrating a cross-section view of a semiconductor device characterized by an integration scheme according to embodiments of the subject technology.

FIG. 7 is a simplified diagram illustrating a cross-section view of a semiconductor device 700 characterized by an integration scheme according to embodiments of the subject technology. This diagram merely provides an example, which should not unduly limit the scope of the claims. As shown, semiconductor device 700 includes a circuit 704. For example, circuit 704 may include an ASIC. Circuit 704 includes a first connector 706a and a second connector 706b. Second connector 706b is positioned at a first location. As an example, first connector 706a and second connector 706b may include a PHY circuit, which can be configured for facilitating electrical, mechanical, and/or procedural bridging among electrical components.

According to some embodiments, semiconductor 700 further includes an interposer 702. For instance, circuit 704 is coupled to interposer 702. Interposer 702 may be configured to provide electrical connections for circuit 704 and/or other components. In various implementations, interposer 702 includes a first interconnect 714 and a second interconnect 716. First interconnect 714 and a second interconnect 716 may include, without limitation, metal traces, vias, and/or other conductive materials and structures.

In various implementations, a first buffer die 708 may be coupled to circuit 704 via interposer 702. For instance, first buffer die 708 is coupled to interposer 702. First buffer die 708 may include a first selector 710, a third connector 718, and a fourth connector (not shown). Third connector 718 and the fourth connector may include one or more IO pins. Depending on the implementation, first buffer die 708 may couple to a first memory device 712. For example, first memory device 712 includes an HBM and is configured to boost bandwidth and reduce power consumption. First memory device 712 may be coupled to circuit 704 via first buffer die 708 to facilitate rapid data processing and transmission for computation-intensive applications. In some cases, first buffer die 708 is coupled between first memory device 712 and circuit 704 to offer increased HBM offsets.

In various implementations, a data path selection mechanism can be implemented to select a subset of connectors of first buffer die 708 for routing towards circuit 704. Circuit 704 may be configured to send a first signal using first connector 706a to indicate a first selection. As an example, the first selection can be determined based the spatial proximity of connectors on first buffer die 708 to their corresponding connector on circuit 704 (e.g., second connector 706b). In an example, third connector 718 may be positioned closer to the first location than the fourth connector. First selector 710 may be configured to couple third connector 718 to second connector 706b based on the first signal. First selector 710 may include a multiplexor. For instance, first selector 710 is coupled to first connector 706a through first interconnect 714. Third connector 718 is coupled to second connector 706b through second interconnect 716. Depending on the implementation, third connector 718 is coupled to second connector 706b in accordance with a predetermined routing rule. The predetermined routing rule may be characterized by a first routing angle. In an example, the first routing angle is less than or equal to 45 degrees.

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. An apparatus comprising:
a circuit comprising a first connector and a second connector, the circuit being configured to send a first signal using the first connector to indicate a first selection, the second connector being positioned at a first location;
an interposer comprising a first interconnect and a second interconnect; and
a first memory device comprising a first selector and a third connector and a fourth connector, the first selector being coupled to the first connector through the first interconnect, the first selector being configured to couple the third connector to the second connector through the second interconnect based on the first signal, the third connector being positioned closer to the first location than the fourth connector;
wherein the first selection comprises a selection of a connector of the first memory device to be coupled to the second connector and is determined based on a spatial proximity associated with the first memory device; and
wherein the third connector is coupled to the second connector in accordance with a predetermined routing rule characterized by a first routing angle.

2. The apparatus of claim 1, further comprising a second memory device, wherein:
the circuit further comprises a fifth connector and a sixth connector, the circuit being configured to send a second signal using the fifth connector to indicate a second selection, the sixth connector being positioned at a second location;
the interposer further comprises a third interconnect and a fourth interconnect; and
the second memory device comprises a second selector and a seventh connector and an eighth connector, the second selector being coupled to the fifth connector through the third interconnect, the second selector being configured to couple the sixth connector to the seventh connector through the fourth interconnect based on the second signal, the seventh connector being closer to the second location than the eighth connector.

3. The apparatus of claim 1, wherein the circuit comprises an application specific integrated circuit.

4. The apparatus of claim 1, wherein the first memory device comprises a high bandwidth memory.

5. The apparatus of claim 1, wherein the first connector comprises a physical layer circuit.

6. An apparatus comprising:
a circuit comprising a first connector and a second connector, the circuit being configured to send a first signal using the first connector to indicate a first selection, the second connector being positioned at a first location;
an interposer comprising a first interconnect and a second interconnect; and
a first buffer die comprising a first selector and a third connector and a fourth connector, the first selector being coupled to the first connector through the first interconnect, the first selector being configured to couple the third connector to the second connector through the second interconnect based on the first signal, the third connector being positioned closer to the first location than the fourth connector;
wherein the first selection comprises a selection of a connector of the first memory device to be coupled to the second connector and is determined based on a spatial proximity associated with the first memory device; and
wherein the third connector is coupled to the second connector in accordance with a predetermined routing rule characterized by a first routing angle.

7. The apparatus of claim 6, further comprising a first memory device coupled to the first buffer die.

8. The apparatus of claim 6, further comprising a first memory device coupled to the interposer.

9. The apparatus of claim 8, wherein the first memory device comprises a high bandwidth memory.

10. The apparatus of claim 6, wherein the circuit comprises an application specific integrated circuit.

11. The apparatus of claim 6, wherein the first buffer die is coupled to the interposer.

12. The apparatus of claim 6, wherein the third connector is coupled to the second connector through the second interconnect.

13. The apparatus of claim 6, wherein the first selector comprises a multiplexor.

14. The apparatus of claim 6, wherein the first connector comprises a physical layer circuit.

15. An apparatus comprising:
a circuit comprising a first connector and a second connector, the circuit being configured to send a first signal using the first connector to indicate a first selection, the second connector being positioned at a first location;
an interposer coupled to the circuit, the interposer comprising a first interconnect; and
a first memory device comprising a first selector and a third connector and a fourth connector, the first selector being coupled to the first connector through the first interconnect, the first selector being configured to couple the third connector to the second connector based on the first signal, the third connector being positioned closer to the first location than the fourth connector;
wherein the first selection comprises a selection of a connector of the first memory device to be coupled to the second connector and is determined based on a spatial proximity associated with the first memory device; and
wherein the third connector is coupled to the second connector in accordance with a predetermined routing rule characterized by a first routing angle.

16. The apparatus of claim 15, wherein the circuit comprises an application-specific integrated circuit.

17. The apparatus of claim 15, wherein the first memory device comprises a high bandwidth memory.

18. The apparatus of claim 15, wherein the first selector comprises a multiplexor.

* * * * *